(12) United States Patent
Barel et al.

(10) Patent No.: US 6,241,938 B1
(45) Date of Patent: Jun. 5, 2001

(54) SINGLE-STAGE APPARATUS AND METHOD FOR PRODUCING CONTAINERS MADE OF THERMOPLASTIC MATERIAL

(76) Inventors: Moreno Barel, via Ignazio Silone 14, 31025 S. Lucia di Piave; Franco Bellotto, via Asiago 6/2, 31014 Colle Umberto; Alessandro Rosso, via Caldella 23/L, 31053 Pieve di Soligo, all of (IT)

( * ) Notice: Subject to any disclaimer, the term of this patent is extended or adjusted under 35 U.S.C. 154(b) by 0 days.

(21) Appl. No.: 08/816,049

(22) Filed: Mar. 11, 1997

(51) Int. Cl.⁷ .............................. B29C 49/06; B29C 49/36
(52) U.S. Cl. ..................... 264/521; 264/520; 264/527; 264/538; 264/234
(58) Field of Search .................................. 264/520, 521, 264/538, 527, 234; 425/526

(56) References Cited

U.S. PATENT DOCUMENTS

| | | | |
|---|---|---|---|
| 4,025,594 | * 5/1977 | Agrawal | 264/97 |
| 4,072,456 | * 2/1978 | Appel et al. | 425/183 |
| 4,382,905 | * 5/1983 | Valyi | 264/520 |
| 4,431,398 | * 2/1984 | Aoki | 264/521 |
| 4,889,247 | * 12/1989 | Collette et al. | 264/521 |
| 5,011,648 | * 4/1991 | Garver et al. | 264/521 |
| 5,744,176 | * 4/1998 | Takada et al. | 425/526 |
| 5,869,110 | * 2/1999 | Ogihara | 264/521 |

* cited by examiner

Primary Examiner—Jan H. Silbaugh
Assistant Examiner—Suzanne E. McDowell
(74) Attorney, Agent, or Firm—Wenderoth, Lind & Ponack, L.L.P.

(57) ABSTRACT

A method of producing parisons of thermoplastic material, which includes the steps of injection of plasticized resin into a plurality of multiple-cavity molds, removal of the parisons from the respective injection molds and transferring parisons to conditioning stations to go through a temperature conditioning phase. The parisons are held in the conditioning stations for a pre-determined length of time, and then the parisons are transferred into appropriate blow molding tools in order to blow the conditioned parisons. Further, during the conditioning phase, the temperature of the surface of the collar of the parison is caused to increase, while the temperature of the parison body is allowed to decrease, so that at the end of the conditioning phase the temperature of the surface of the collar of the parison exceeds by approximately 15 to 20° C. the temperature of the parison body. Also, after the temperature conditioning phase, and before the subsequent blow molding phase, there is a temperature balancing phase in order to permit the temperature of the parisons to evenly spread throughout the parisons by letting them dwell in still ambient air conditions.

9 Claims, 5 Drawing Sheets

SINGLE-STAGE APPARATUS AND METHOD FOR PRODUCING CONTAINERS MADE OF THERMOPLASTIC MATERIAL

BACKGROUND OF THE INVENTION

The present invention refers to a method and an apparatus for mass producing containers made of thermoplastic material, particularly polyethylene terephthalate (PET) and polypropylene (PP), for applications involving also their being filled with liquids at an elevated temperature and/or containing $CO_2$ (carbon dioxide) gas.

In the field of technologies and machines for producing containers of the above cited kind there are a number of developments and improvements aimed at obtaining production methods and related apparatuses capable of producing the containers in an increasingly robust, reliable, cost-effective, versatile manner, and to increasingly high quality standards, in a highly competitive industrial context of very large-scale production.

Such production processes are known to be able to be schematically divided into two basic types, i.e. single-stage and two-stage processes, wherein the present invention applies only to single-stage methods and apparatuses.

Single-stage processes are so named due to the fact that they are capable of producing the so-called parison or bubble, transferring such parison or bubble from the injection or extrusion mold (after allowing it to cool down to any appropriate temperature) to a conditioning station where it levels evenly off at a temperature of preferred molecular orientation. The parison or bubble is then transferred to a blow-molding die, where it is molded into its ultimate, desired shape.

Inherent to any single-stage process is the fact that an uneven heat distribution is unfailingly brought about in the cross-sectional direction of the wall thickness of the parison when the latter is transferred from the injection or extrusion mold. A number of methods and processes have been patented concerning the cycle times and the temperatures of the parison when this is extracted from the injection mold, in an attempt optimize them.

The patent literature covering single-stage processes discloses in all cases a final forming or molding of the container of thermoplastic material which is in some way or other carried through a conditioning station to reach an even wall temperature throughout the cross-section of the same wall, the temperature corresponding to the preferred molecular orientation temperature of the thermoplastic resin.

In particular, the improved solution disclosed in the U.S. Pat. No. 4,372,910 and U.S. Pat. No. 4,470,796 granted to Stroup, the preferred embodiment of which has been implemented in a single-stage injection-blow molding machine made by Van Dorn Plastic Machinery as generally disclosed in the patent specification to Stroup.

Such patents substantially describe and claim a process and an apparatus for producing hollow plastic bodies, typically bottles, in which the parison is obtained by the continuous extrusion of a flow of thermoplastic resin, particularly PET, in a plurality of multiple molds. The result of the invention disclosed in the patents is the elimination of the limitation placed on productivity by the fact that the parison molding operation, including the time taken by the plastic in the mold to cool down, is considerably longer than the subsequent blow molding operation. Since these operational times occur in series, i.e. in sequence, this fact causes in practice the blow molding rate to be slowed down so as to match the slower rate of the parison molding operation.

The improvement disclosed in the above cited patent consists, among other things, in using a plurality of multiple molds which are grouped into at least two distinct groups of molds. The parisons, produced in all molds belongs to a definite group of molds, are blow molded, as grouped on a mold-by-mold basis, in a single respective blow molding machine.

In this manner, the duration of the entire blow molding phase is virtually slowed down through the multiplication of the related production, so that the final overall rate of the blow molding phase is synchronized with the parison molding phase, thereby obtaining an elimination of the idle, i.e. waiting times and the associated losses in productivity.

However, such a solution does not solve the problem associated with the long parison molding times which keep conditioning the overall cycle time due in particular to the time required to cool down the parisons in the respective injection molds.

In order to reduce such a molding time a solution is known from U.S. Pat. No. 4,382,905 to E. I. Valyi, and granted to American National Can Company, which consists in reducing the parison molding time through the introduction of an additional holding phase between the molding phase and the parison conditioning phase.

In the holding phase, the parison is removed from its injection mold and transferred as quickly as possible into a special holding mold before the regular cool-down time of the injection mold is elapsed, but after allowing the temperature to adequately decrease so as to minimize the risk of crystallization, indicated at approximately 200° C., and approach the orientation temperature.

The parison is then kept in the additional holding mold until the temperature of the parison decreases to the orientation temperature, i.e. approximately 95° C.

The parison is eventually removed from the mold and transferred into the conditioning station and the subsequent cycle according to well-known methods.

The purpose of such an invention is to increase the productivity of the production process by reducing the dwelling time of the parison in the injection mold and, therefore, increasing the rate and, as a result, the overall productivity.

The time that is saved in this way is then spent in the additional holding mold. However, being that the latter is arranged in series, the rate of all process phases can be advantageously accelerated, thereby obtaining an improvement in the overall productivity of the process.

However, the improvement that can actually be brought about in such a manner is rather modest owing to the limited maneuvering speed of the molds concerned, due to their inertia and various other factors. Furthermore, an apparatus modified in such a manner is more expensive and complicated in its construction, as well as more delicate and maintenance-intensive in, its practical use due to its greater complexity associated with the addition of a second set of molds.

In order to mitigate the problem represented by the slowness of the molding process of a thermoplastic resin due to the time required by the same resin to shrink when injected into the mold and during cooling down, the U.S. Pat. No. 3,709,644 granted to Farrell Patent Company discloses a method based on the arrangement of a cylindrical element, with an inner piston sliding in the cylinder, arranged in parallel with respect to the mold and adapted to exert an additional pressure on the fluid resin contained in the mold during the cool-down phase, as well as a valve adapted to separate the plastified-resin injector or extruder element from the mold and compactor during the cool-down phase of the resin in the mold.

Although such a solution is actually effective in enhancing the quality of the end product and reducing the cycle time, albeit in a limited way, the fact remains that it is anyway necessary to spend the entire time needed to fill the mold and, subsequently, to compress the resin in the same mold, as well as to allow for the parison to duly cool down, such aggregate time being unavoidably arranged to occur in series and in the same injection mold, with the result of a practically insignificant improvement in overall productivity.

Such a situation could actually be improved if the time taken to complete the slowest phase, i.e. filling the resin in the parison injection mold and allowing it subsequently to cool down, could be reduced without altering either, the general process or the characteristics of the end product to any considerable extent. As far as the cool-down time is concerned, this is practically constrained by the fact that a sufficiently low temperature shall be reached on the parison body, since the subsequent conditioning phases, which are carried out with generally known techniques, and in particular by means of IR heating techniques, to the main purpose of heating up the collar of the parison and even it out at an optimum temperature (approximately 115° C.), have the effect of bringing about also a rise, beyond generally acceptable values, in the temperature of the body of the parison, so that the need arises to begin the conditioning phase in the presence of a sufficiently low temperature. This therefore involves a definite cooling of the parison when the latter is still in the mold and, as a result, a minimum cooling time that cannot practically be reduced, thereby placing a limitation on the possibility of reducing the cycle time.

Owing to all these considerations, it is therefore a main purpose of the present invention to use a single-stage method and apparatus to produce a container of thermoplastic resin that is thermally stable, capable of being filled with both hot and/or carbonated or non-carbonated beverages. The method and apparatus must be capable of enabling the total occupation time of the injection mold by the parison to be reduced through a decrease in the time required to cool it down, reliable, cost-effective and easily implementable with readily available techniques.

These and further objects of the present invention will become apparent to those who are skilled in the art from reading and understanding the description that is given below.

SUMMARY OF THE INVENTION

The present invention leads substantially to the practical result of a reduction of the parison cooling time in the mold and a contemporaneous selective heating of just the collar of the same parison during the conditioning phase, i.e. without implying a heating of the entire body of the parison under such conditions as to be able to bring both the collar and the body of the parison to respective optimum, uniform temperatures.

BRIEF DESCRIPTION OF THE DRAWINGS

A non-limiting example of an embodiment of the present invention is described below and illustrated in detail with reference to the accompanying drawings, in which.

DETAILED DESCRIPTION OF THE INVENTION

A peculiar feature of the present invention is the use of a parison temperature conditioning process which is selective with respect to the surface of the parison, i.e. it is able to heat up only the surface of the zone underneath the collar, which comes out of the mold at a temperature that is lower than the temperature of remaining portion of the body and is anyway inadequate in view of an optimum outcome of the subsequent blow molding phase. While it does not act on the body of the parison, which is at a higher temperature due to its thermal capacity being greater than the thermal capacity of the zone underneath the collar, which is commonly and technically called the "transition zone".

Figure 1:
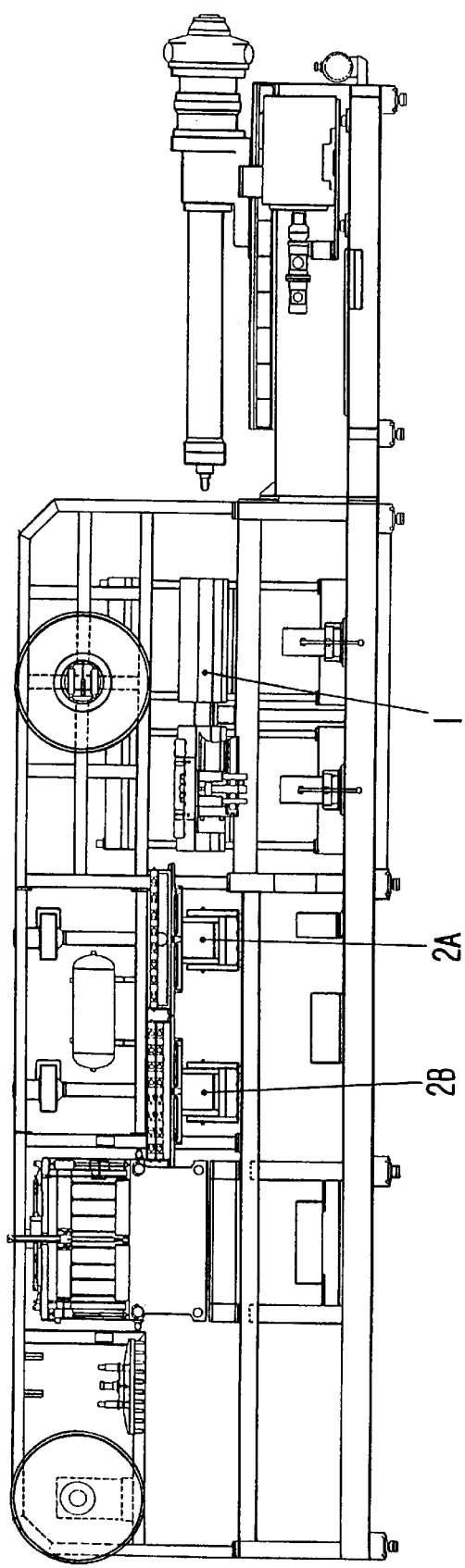
FIG. 1 shows basic representation of the architecture of a prior-art apparatus.

With reference to FIG. 1, a typical prior-art apparatus comprises substantially a stage 1 in which the molten thermoplastic resin is injected in appropriate molds for forming the parisons, and a stage in which the parisons are conditioned. The stage is in turn made up by two distinct, subsequent half-stages 2A and 2B.

The two parison conditioning half-stages have the purpose of raising the temperature of the parison up to a value which, lying at approximately 115° C., is an optimum one in view of the subsequent blow molding phase.

This raising of the temperature is in particular required for the zone 10 underneath the collar of the parison, which comes out of the mold at a temperature which is perceptibly lower than the temperature of the body 12 of the parison.

The invention consists in a controlled combination of the following process:

a reduction in the parison cooling time inside the injection mold, and selective heating of the same parison in the subsequent conditioning stage, in the sense that only the zone 10 underneath the collar is heated here, while the rest of the body 12 of the parison remains practically unaffected.

Figure 2:
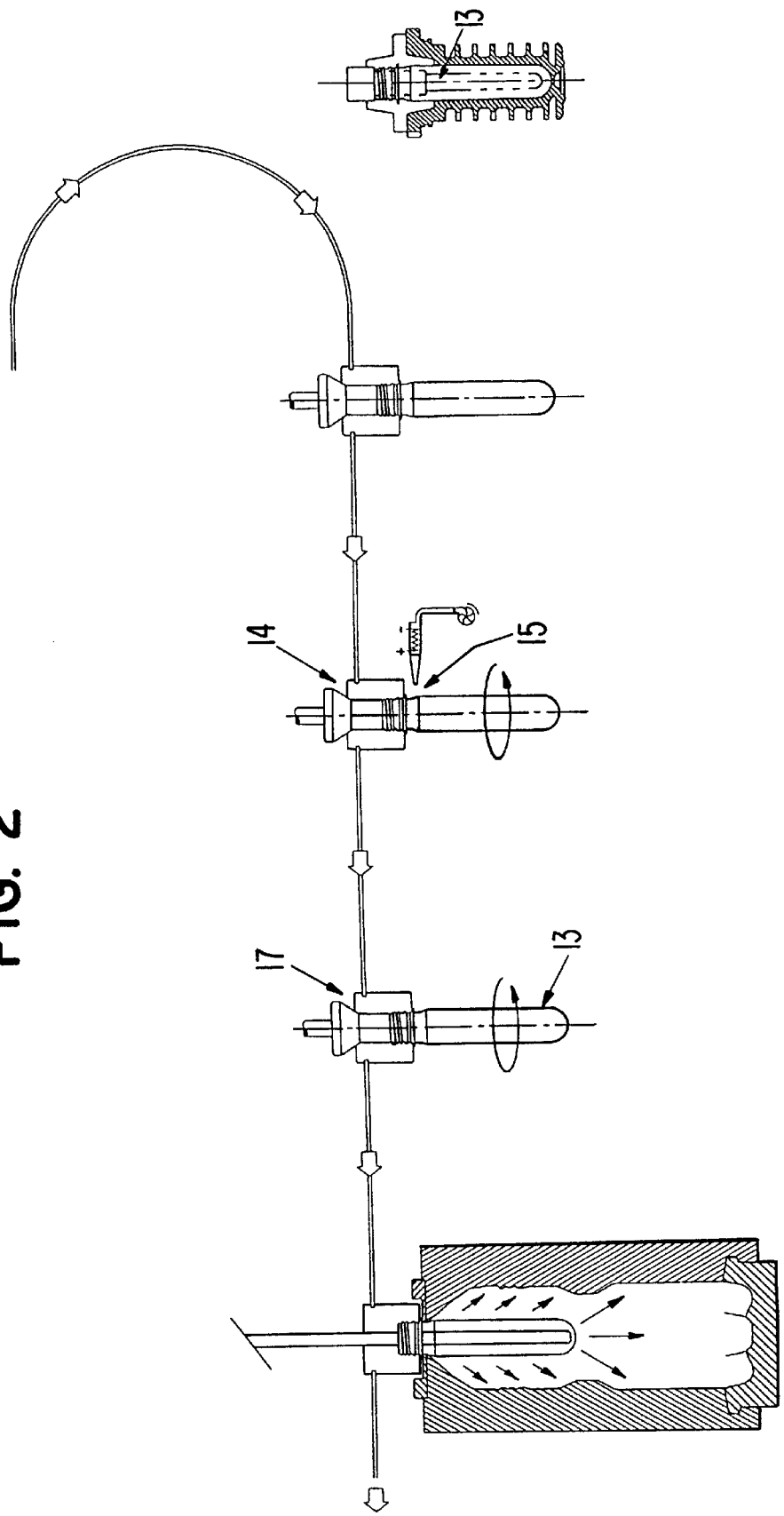
FIG. 2 is a schematic, simplified elevational view of a characteristic arrangement of an apparatus according to the present invention.
Figure 3:
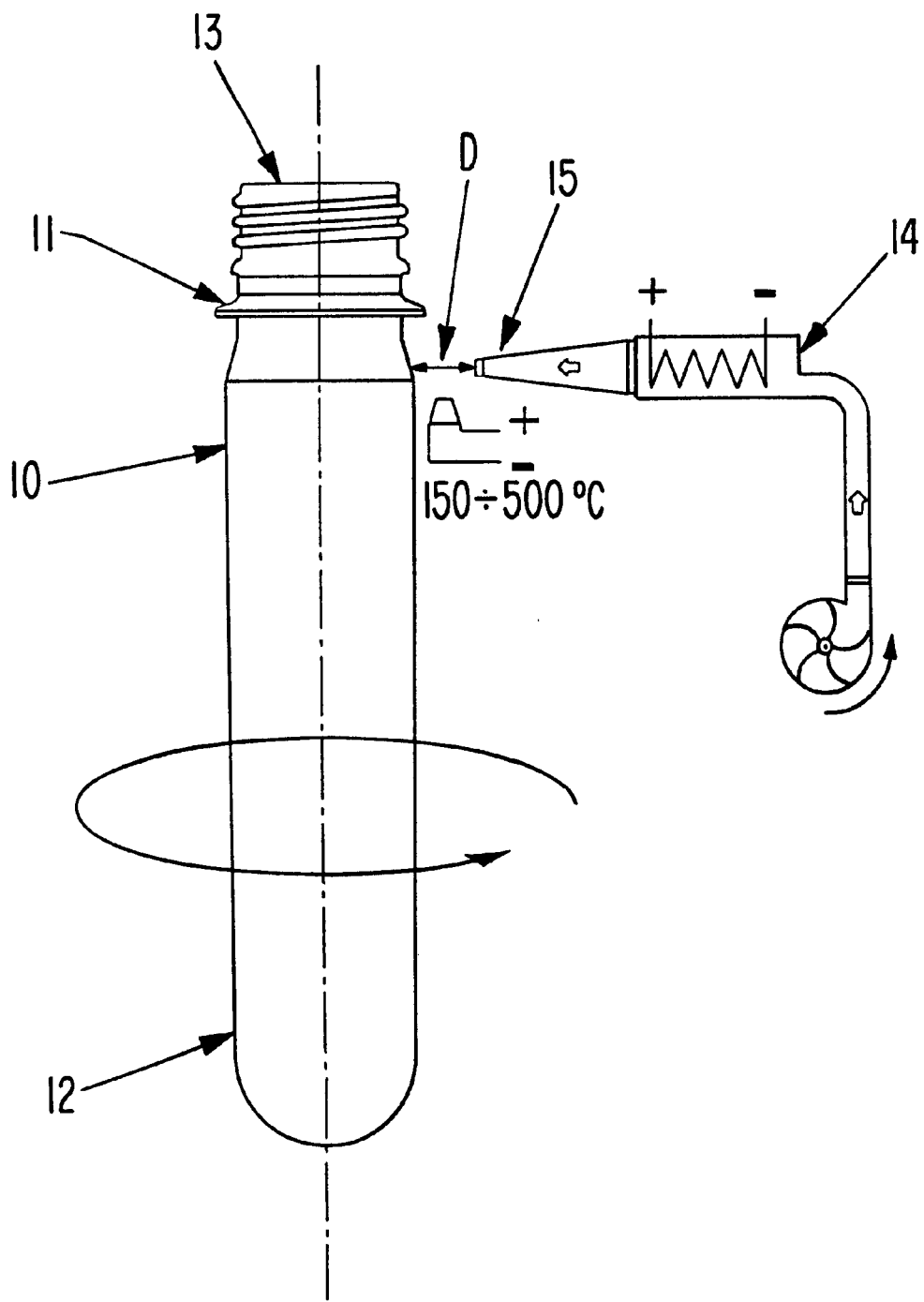
FIG. 3 is a median cross-sectional view of the arrangement shown in FIG. 2, along with the longitudinal section of a typical parison.

With reference to FIGS. 2 and. 3, in view of obtaining, such a spatially selective heating effect, use is made of a jet of very hot air which, is pre-heated with means that are generally known, in the art, and is blown exactly against the zone to be heated up, i.e. underneath the collar 11.

A train of parisons 13 is arranged in front of a first conditioning station 14 made up of a plurality of heating ports 15, so that each parison stops exactly in front of a corresponding heating port. The height of the heating ports 15 is defined so that the flow of the emitted air is almost a laminar one and the ports are further located at a definite proximity D to the zone under the collar of the parison (approximately 10 mm or even less) for the purpose of both facilitating the heating thereof and minimizing the possible heating-up effect of the body 12 of the parison.

Each one of the ports 15 is supplied with a flow which is heated to a suitable temperature, preferably a temperature of approximately 500° C., with means that are known in the art and are not shown here.

The flow of hot air reaching the parison hits it only in the zone 10 thereof under the respective collar 11, while it will not hit it in the zone of the body 12 thereof, which therefore cools down naturally since it is not affected by the flow.

Figure 5:
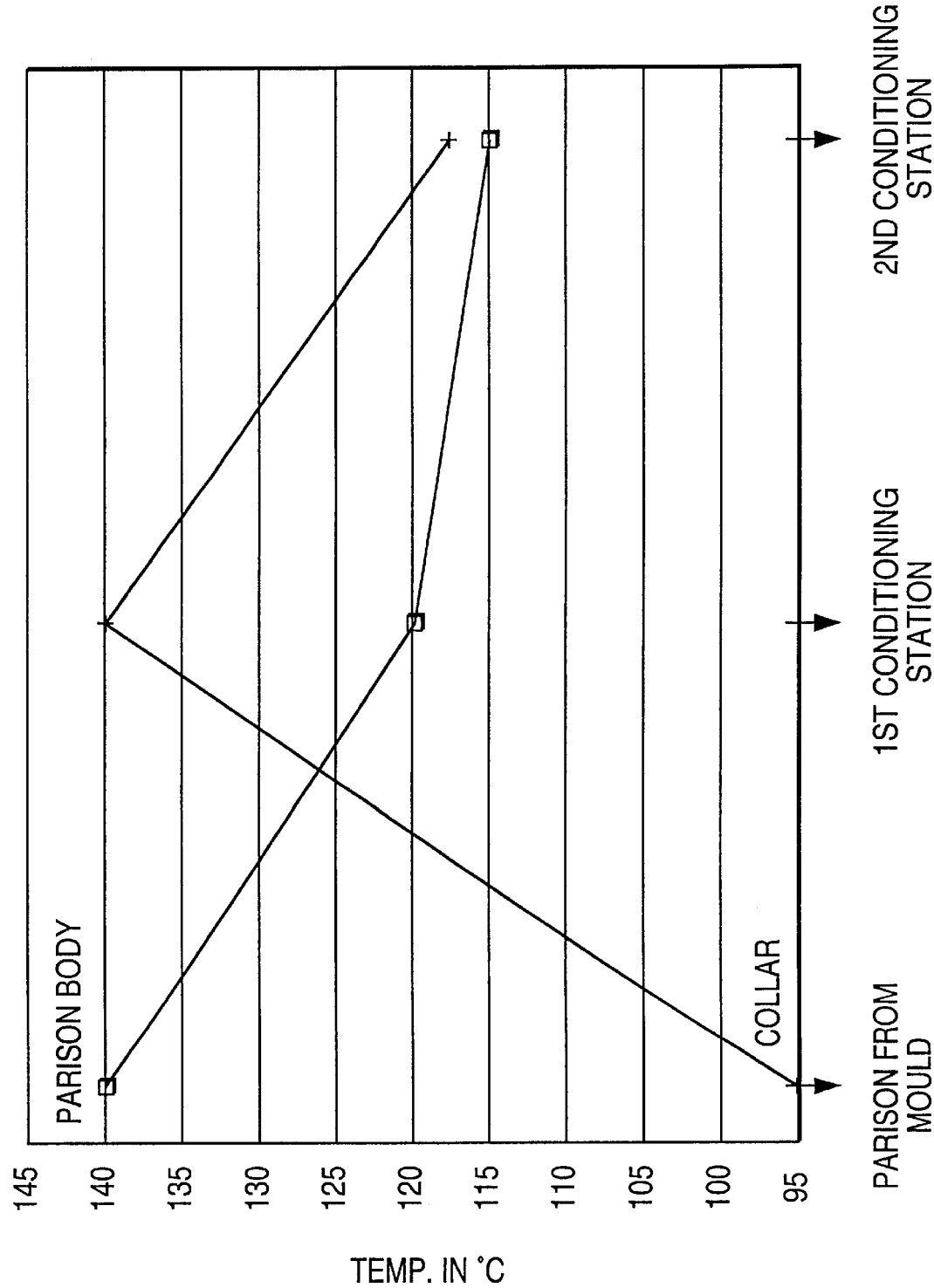
FIG. 5 is a corresponding diagrammatical representation of the temperature evolution pattern in two distinct characteristic portions of a parison treated according to the present invention; and Table A gives typical values of the temperature of the parison as referred to both a traditional process and the process in accordance with the present invention.

It has been shown experimentally that a particularly advantageous pattern is reached when the temperatures vary in a manner as shown in FIG. 5 by the graphs referring to the evolution of the temperature around the transition zone and on the parison.

At the initial instant 0, corresponding to the moment in which the parison is released from its respective mold, the temperature of the parison body portion is at approximately 140° C., whereas the temperature of the collar portion of the same parison is at approximately 95° C., due to the far greater heat dissipation of such a portion, which involves wall thicknesses that are thinner, and therefore much more quickly cooled down, than the body portion of, the same parison.

The parison is then transferred to a position in front of its respective heating port and the temperature of the zone underneath its collar is caused to increase up to a value of 135° C. to 140° C. by the flow of hot air that hits it, while the temperature of the body portion 12, which is not affected by such a heating action, decreases naturally down to a value of approximately 120° C.

It must be duly stressed that such a diverging evolution pattern of the two temperatures is the result of the outer surface of the parison being heated selectively in a manner which is not obtainable by any traditional infrared heating method, but is obtained according to the present invention with a blow of air heated up to a very high temperature, i.e. approximately 500° C., which, as already mentioned, enables only the zone of the parison underneath the collar, and not the body of the same parison, to be heated. Since the body of the parison is not heated, it therefore cools down naturally. However, since even at the beginning of the blow molding phase the temperature of the parison shall ideally be evenly distributed, at a value preferably between 115° C. and 120° C., it ensues that the parison itself shall be removed from its respective parison injection mold in advance of the moment at which it should be removed according to the traditional method, so that the time required for the body of the parison to cool down turns out to be essentially equal to the time required for the zone underneath the collar of the same parison to be heated up, and thus it is necessary for both the parison portions to eventually lie at approximately the same temperature value.

However, it is just such an earlier removal of the parison from its respective injection mold that enables the duration of the whole parison moldings phase to be reduced and, since such a parison molding phase is, largely known to be actually by far longest phase of the whole process, and it therefore is the actual phase which determines the productivity of the whole single-stage apparatus for the production of hollow bodies, particularly bottles, the obvious result of such an earlier ejection of the parison from the respective injection mold, as determined in the process by a method according to the present invention, is that it increases the productivity of the whole plant correspondingly.

Should it be implemented without any further improvement, such a solution would however causing a drawback in that the higher temperature on the collar of the parison would be too high with respect to the one which is actually required by the subsequent blow molding phase. Furthermore, the higher temperature would be localized only on the outer surface of the collar of the parison, i.e. the surface which had been directly exposed to the heating air flow.

An advantageous improvement is therefore introduced which is capable of contextually eliminating all such problems. With reference to FIG. 2, such an improvement can essentially consist of the addition of a second conditioning station 17, in which the parisons are therefore transferred for a short period. The second conditioning station 17 is essentially characterized in that the parisons are caused to simply dwell in it to allow them to cool down naturally and the heat to diffuse in such a manner that, at the end of this phase, the temperature distribution pattern is as shown in FIG. 5. The body, due to its elevated thermal inertia, is at essentially the value at which it leaves the first conditioning station 14, while the temperature of the collar decreases remarkably down to the same value of the body, i.e. approximately 115° C. However, this is due to an effect which is not due to external cooling, but to a diffusion of the heat stored in the surface layers of the collar towards to the colder inner layers thereof.

As a ultimate result at the end of all such processes and respective conditioning stations the desired final outcome is obtained, i.e. a parison at an optimum temperature throughout its portions, with a considerably reduced injection cycle time.

It has been experimentally demonstrated that a further improvement is reached if the parisons are caused to rotate about their own axis when they are dwelling in the conditioning stations 14 and/or in the temperature balancing stations 17. The advantage derived from such an expedient consists in the temperature of the parison getting balanced in a more effective, quicker manner, since the parison itself is sequentially exposed with its entire surface to the whole outer environment which contributes to the temperatures becoming more uniform throughout the parison since it acts as a weak, but steady radiation source to which the whole of the parison surface is exposed.

Figure 4:
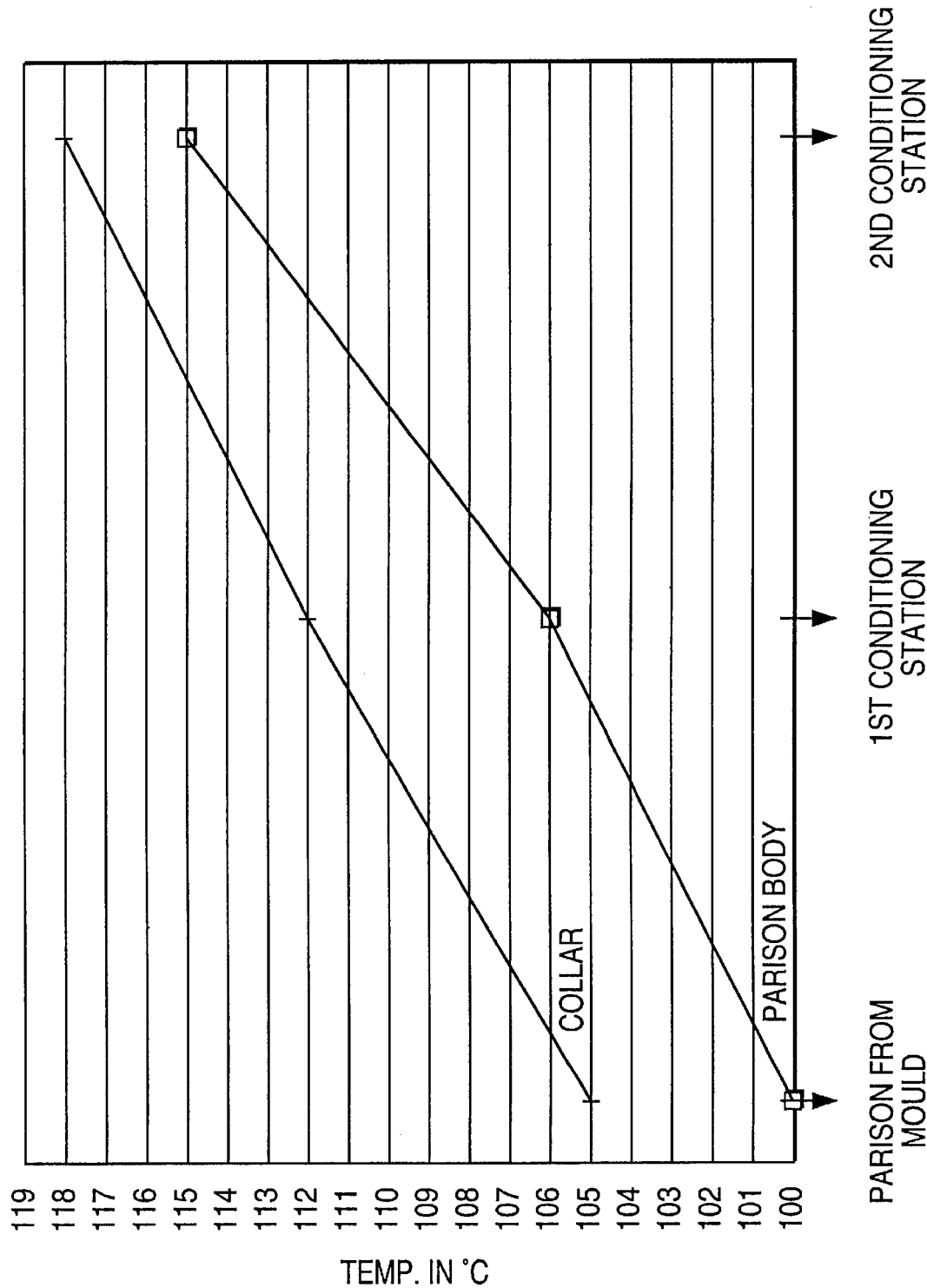
FIG. 4 is a diagrammatical representation of the temperature evolution pattern in two distinct characteristic portions of a parison according to a traditional process.

In order to gain a deeper insight into the different evolution of the temperature patterns, the graph shown in FIG. 4 and Table A should be referred to. These illustrate the evolution of the temperatures in a traditional infrared-heating process and apparatus, where the first conditioning station 2A represents a first phase in which the whole parison is heated, while the second conditioning station 2B represents a second such heating phase.

It can be easily noticed that, in the second station, both the temperature of the collar and the temperature of the body of the parison are further increased, in confirmation of the fact that such a heating phase affects the whole parison. It can furthermore, and above all, be noticed that the temperature prevailing in the body of the parison as the latter leaves the injection mold is approximately 100° C., i.e. considerably lower than the corresponding temperature that can be observed in the process according to the present invention, as illustrated in FIG. 5, as a result of the much longer duration of the parison cool-down time.

Further advantages and beneficial effects of the present invention have additionally become apparent in the course of various experiments that have been carried out for testing purposes, i.e.:

(1) the time required for heating the collar by means of a laminar flow of hot air has been shown to be much shorter than the time needed for a corresponding heating process to be carried out by means of traditional IR methods; in fact, when using a typical parison as a reference, such time has turned out to amount to approximately 20 seconds with the hot-air method according to the present invention, as opposed to approximately 60 seconds needed with the traditional infrared-heating method;

(2) the adjustment of the position of the hot-air heating element is capable of being performed in a by far simpler and quicker manner as compared with a infrared heating device and sheathed resistance-type heating rods, since it requires an average time of approximately 10 minutes as opposed to approximately 60 minutes needed with traditional-type arrangements;

(3) energy costs for hot-air conditioning are definitely lower, by approximately 50%, than the energy costs involved in infrared-type conditioning means;

(4) overall reliability appears to be definitely higher with the apparatus according to the present invention, since it involves the use of largely known, improved techniques and component parts; in particular, in the conventional arrangements, dust depositing onto infrared heat lamps is liable to impair the efficiency thereof, while such an occurrence is totally avoided when using the technique according to the present invention;

(5) the overall operating conditions and efficiency of the apparatus are improved, since it is no longer necessary to dispose of the considerable amount of heat that fails to be absorbed by the parison, and that is therefore dispersed elsewhere throughout the machine by the IR heating;

(6) the adjustment of the hot-air heating power is capable of being performed in a much more accurate and flexible manner as compared with the traditional heating means;

(7) hot-air conditioning is such as to allow the parisons to be given, in their collar portion, a shape which is much more suitable in view of the subsequent blow molding process; furthermore, the possibility exists for the amount of material in the zone immediately underneath the collar to be metered with great accuracy, thereby eliminating the unstretched amorphous portion between the shoulder and the neck of the bottle, since hot-air heating allows the energy to be focused onto a very narrow zone of the parison. It has been experimentally shown that, with certain types of 2-1 bottles, up to 2 grams of material can be saved per bottle in such a zone alone.

All such advantages are more effectively achievable when the conditions of both the process and the apparatus are set to their optimum values, which have been determined experimentally to involve a temperature of the air blown by appropriate ejectors 15 lying between 150° C. and 500° C., and a distance of the ejectors from the collar portions of the respective parisons lying anywhere between 5 and 8 mm.

As far as the times needed for conditioning and temperature stabilization purposes in the respective stations, it has been found that these can be much shorter than the cycle time involved in the injection molding phase, even if shortened, while both of them can be actually reduced down to half of the cycle time, except of course for possibly required adjustments to allow for transfer and handling times.

What is claimed is:

1. A single-stage method for the production of parisons of thermoplastic material for being converted into plastic bottles or hollow bodies in a subsequent blow molding process, the method comprising:

injecting plasticized resin into a plurality of multiple-cavity molds to form therein a plurality of parisons, wherein each of said parisons has a parison body, a collar and a parison zone located underneath the collar and the parison zone has a surface;

removing said parisons from the injection molds;

transferring the parisons to temperature conditioning stations and holding said parisons in the temperature conditioning stations for a predetermined length of time during a temperature conditioning phase;

heating, at the temperature conditioning stations, only the surface of the parison zone of each parison in order to increase the temperature of the parison zone surface, while permitting the temperature of the parison body to decrease such that the temperature of the surface of said parison zone underneath the collar exceeds by approximately 15 to 20 degrees centigrade the temperature of the parison body of the same parison;

subjecting said parisons to a temperature balancing phase occurring after said temperature conditioning phase; and prior to the blow molding process, the temperature balancing phase comprising holding said parisons in still ambient air conditions to permit the temperature of each of the parisons to evenly spread throughout the parison; and transferring said parisons from said temperature conditioning stations into blow molding tools, wherein during the removal of the parisons from the injection molds, the temperature of the parisons at the parison zone is approximately 95 degrees centigrade, and the temperature of a central portion of the parison body is approximately 140 degrees centigrade, and, after the temperature conditioning phase, the temperature of the surface of the parison zone is approximately 140 degrees centigrade and the temperature of the central portion of the parison body is approximately 120 degrees centigrade.

2. The method as claimed in claim 1, wherein, during said temperature balancing phase, the temperature of the central portion of the parison body remains essentially stable, while the temperature of the surface of the parison zone decreases until it reaches the temperature of the central portion of the parison body.

3. The method as claimed in claim 2, wherein during said temperature conditioning phase and/or said temperature balancing phase, each of the parisons is rotated about its own longitudinal axis at a rotating speed ranging from 10 to 50 rpm in order to promote heat transfer throughout the parison.

4. The method as claimed in claim 1, wherein during said temperature conditioning phase and/or said temperature balancing phase, each of the parisons is rotated about its own longitudinal axis at a rotating speed ranging from 10 to 50 rpm in order to promote heat transfer throughout the parison.

5. The method as claimed in claim 1, wherein, during the temperature conditioning phase, a jet of heated air is applied to the surface of each parison at an area below the collar thereof, while permitting the temperature of the parison body to decrease until the temperature of the surface below the collar exceeds by approximately 15 to 20 degrees centigrade the temperature of the parison body; and the parisons are transferred from the temperature conditioning stations into blow molding tools.

6. A single-stage method for the production of parisons of thermoplastic material for being converted into plastic bottles or hollow bodies in a subsequent blow molding process, the method comprising:

injecting plasticized resin into a plurality of multiple-cavity molds to form therein a plurality of parisons, wherein each of said parisons has a parison body, a collar and a parison zone located underneath the collar and the parison zone has a surface;

removing said parisons from the injection molds;

transferring the parisons to temperature conditioning stations and holding said parisons in the temperature conditioning stations for a predetermined length of time during a temperature conditioning phase;

heating, at the temperature conditioning stations, only the surface of the parison zone of each parison in order to increase the temperature of the parison zone surface, while permitting the temperature of the parison body to decrease such that the temperature of the surface of said parison zone underneath the collar exceeds by approximately 15 to 20 degrees centigrade the temperature of the parison body of the same parison; and transferring said parisons from said temperature conditioning stations into blow molding tools, wherein during the removal the parisons from the injection molds, the temperature of the parisons at the parison zone is approximately 95 degrees centigrade, and the temperature of a central portion of the parison body is approximately 140 degrees centigrade, and, after the temperature conditioning phase, the temperature of the surface of the parison zone is approximately 140 degrees centigrade and the temperature of the central portion of the parison body is approximately 120 degrees centigrade.

7. The method as claimed in claim 6, wherein, during said temperature balancing phase, the temperature of the central portion of the parison body remains essentially stable, while the temperature of the surface of the parison zone decreases until it reaches the temperature of the central portion of the parison body.

8. The method as claimed in claim 7, wherein during said temperature conditioning phase and/or said temperature balancing phase, each of the parisons is rotated about its own longitudinal axis at a rotating speed ranging from 10 to 50 rpm in order to promote heat transfer throughout the parison.

9. The method as claimed in claim 6, wherein during said temperature conditioning phase and/or said temperature balancing phase, each of the parisons is rotated about its own longitudinal axis at a rotating speed ranging from 10 to 50 rpm in order to promote heat transfer throughout the parison.

* * * * *